United States Patent [19]

Schipfer et al.

[11] Patent Number: 4,523,007

[45] Date of Patent: Jun. 11, 1985

[54] CROSSLINKING COMPONENT FOR PAINT BINDERS AND PROCESS FOR PRODUCING SUCH COMPONENTS FROM A CARBONYL COMPOUND

[75] Inventors: Rudolf Schipfer; Gerhard Schmölzer, both of Graz, Austria

[73] Assignee: Vianova Kunstharz, A.G., Werndorf, Austria

[21] Appl. No.: 628,844

[22] Filed: Jul. 9, 1984

[30] Foreign Application Priority Data

Jul. 11, 1983 [AT] Austria ............................. 2531/83

[51] Int. Cl.³ .................... C08G 2/18; C08G 16/00
[52] U.S. Cl. .................... 528/227; 524/599; 524/901; 525/398; 525/472; 528/230; 528/243; 528/246
[58] Field of Search ............... 528/227, 243, 246, 230; 525/472, 398; 524/599, 901; 568/303, 420

[56] References Cited

U.S. PATENT DOCUMENTS 3,839,497  10/1974  Ishii et al. ................. 528/227 X
4,172,193  10/1979  Marx et al. ..................... 528/227

*Primary Examiner*—Lucille M. Phynes
*Attorney, Agent, or Firm*—A. W. Breiner

[57] ABSTRACT

A process for producing improved crosslinking components for paint binders which can be crosslinked through transesterification is described. The process is characterized in that an ester of malonic or cyano-acetic acid or aceto-acetic acid is reacted in a KNOEVENAGEL-reaction with a carbonyl compound, preferably with formaldehyde, and the reaction products are polymerized, optionally utilizing free-radical initiators, to provide a polymer having a molecular weight of between about 300 and 6000. The crosslinking components prepared according to the invention provide an unsaponifiable base structure and permit the preparation of products with high functionality. The crosslinking components are preferably utilized in binder systems for cathodically depositable paints.

9 Claims, No Drawings

CROSSLINKING COMPONENT FOR PAINT BINDERS AND PROCESS FOR PRODUCING SUCH COMPONENTS FROM A CARBONYL COMPOUND

FIELD OF INVENTION AND BACKGROUND

The present invention relates to improved crosslinking components for paint binders which can be crosslinked through transesterification, and to the process of producing the crosslinking components.

European patent application No. EP 00 12 463 A 1 describes heat-hardenable binder compositions which crosslink on stoving in the presence of a transesterification catalyst through transesterification of the hydroxy groups of a resin component, which is free from acid groups and ethylenically unsaturated groups, with a polyester, which is free from acid groups and carrying more than one β-hydroxy group. As long as the resin component is a cationic water-dilutable resin, the binder system may be applied by electrodeposition. The introduction of the β-hydroxy ester group, particularly favorable for transesterification reactions, onto the resin component according to this European patent application, is effected through reaction of a polycarboxylic acid anhydride with glycols, glycol monoethers, polyols, and/or, preferably, with monoepoxides. The preferred polyesters carrying β-hydroxy groups are those prepared from trimellitic acid anhydride and a glycidyl ester of a saturated aliphatic carboxylic acid with from 9–11 C-atoms, the carboxy groups thereof being linked to a tertiary carbon atom, known as "glycidylester C 10 E" in the literature. On crosslinking of the aforesaid component, the glycols linked as β-hydroxy esters are set free at stoving temperatures of between 150° and 200° C., and are thus eliminated from the coating. In addition to the relatively high stoving temperatures necessary for reaction even when using transesterification catalysts, the relatively high quantity of decomposition products is a serious disadvantage of the aforesaid type of crosslinking component. Furthermore, high-quality paint raw materials are split off and have to be eliminated from the paint film. This is a drawback for economical as well as for ecological reasons.

AT-PS No. 372 099 therefore, proposes to esterify the carboxy groups of crosslinking components with low molecular weight alcohols. The carboxy groups stem from special dicarboxylic acids, particularly of malonic acid. These dicarboxylic acid esters may be chain ends of oligomeric or polymeric esters.

It has now been found that the hardener function of such esters may be substantially improved if the transesterifiable ester groups are linked to an oligomeric or polymeric structure which will not undergo saponification.

Accordingly, the present invention is directed to a process for producing crosslinking components suitable for water-dilutable paint binders which will crosslink through transesterification, characterized in that a compound of the structure X—CH$_2$—COOR             Formula (I)

in which

X is —COOR, —CN or —COCH$_3$ and
R is an alkyl group with from 1 to 8 C-atoms is reacted in a KNOEVENAGEL-reaction with a carbonyl compound, water being split off, and the resulting α-disubstituted alkylidene compound thereafter polymerized to a polymeric compound having a molecular weight of between about 300 and 6000.

Specifically, the present invention is directed to crosslinking components suitable for water-dilutable binders which will crosslink through transesterification characterized in that a compound of Formula (I) above is reacted in a KNOEVENAGEL-reaction with a carbonyl compound to provide a polymer having the general formula

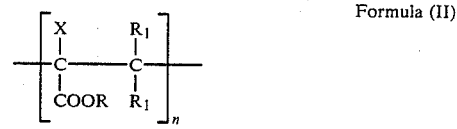

Formula (II)

wherein X and R stand for the same radicals set forth above, and R$_1$ is a hydrogen atom or an alkyl radical. n is a factor which multiplies the unit to provide a molecular weight of between about 300 and 6000.

The invention is further concerned with the use of the crosslinking components prepared according to the present invention in crosslinking binder systems which are crosslinkable through transesterification, and particularly in binder systems which are used in cathodically depositable ED paints.

The following reaction mechanism is theorized for the process of the invention:

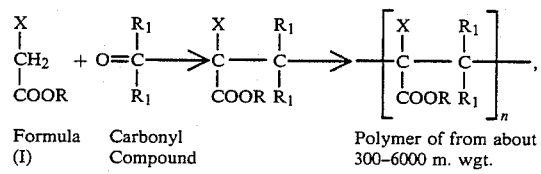

Formula   Carbonyl                        Polymer of from about
(I)        Compound                     300–6000 m. wgt.

X, R, R$_1$, and n have the above-defined values.

The crosslinking components prepared according to the present invention have substantial advantages over the products known in the prior art. For example, oligomeric or polymeric components with higher functionality with respect to the transesterifiable —COOR groups can be produced according to the present invention than is possible with the polyesters produced according to AT-PS No. 372 099. The higher crosslinking density obtained thereby provides improved resistance characteristics of the paint films. "Monofunctional" monomeric esters can also be used according to the process of the invention, such as aceto-acetic acid esters or cyano-acetic acid esters, since no ester functional groups are consumed in providing the increase in molecular weight. Furthermore, the preparation of the component, i.e., the KNOEVENAGEL-reaction and the polymerization, can be carried out in one step, only water being the by-product of the reaction which may be easily eliminated using normal azeotropic means.

The starting materials are the diesters of malonic acid with alkanols having from 1 to 8 C-atoms, preferably 1 to 4 C-atoms, such as dimethylmalonate, diethylmalonate, and n- or isopropyl malonate. In the same way the alkyl or cycloalkyl esters of cyano-acetic acid may be used, such as the methyl-, ethyl-, propyl-, butyl-, 2-ethyl-hexyl-, cyclopentyl-, cyclo-hexyl cyano-acetic acid ester or methyl or ethyl-aceto acetic acid ester.

The preferred carbonyl compound is formaldehyde, particularly in its polymerized form, paraformaldehyde. The use of higher aldehydes, such as acetaldehyde or a butanal or an aromatic aldehyde is possible but provide no special advantage as compared to the inexpensive and readily available formaldehyde. Furthermore, ketones such as methylisobutyl ketone or cyclohexanone can be employed.

Advantageously, the crosslinking component is prepared by adding the paraformaldehyde in portions at about 60° to 70° C. to the ester and dissolving the paraformaldehyde therein. About 0.1 to 1 mole-% of a mixture of piperidine and formic acid are added as catalyst. The reaction temperature should not surpass 90° C. until the paraformaldehyde has dissolved. Then the reaction temperature is slowly raised to 120° to 150° C., and the reaction water as it is formed is stripped from the reaction mixture through azeotropic distillation with an entraining agent, such as an aliphatic or aromatic hydrocarbon. The reaction is monitored with the aid of the reaction water which is forming. The simultaneous polymerization is monitored through a determination of the refractive index or the viscosity.

Optionally, the polymerization can be completed by adding a peroxide initiator. The crosslinking component, after elimination of the entraining agent, can be used substantially free from solvents. Optionally, it may be of advantage to use inert solvents for better handling or distribution in the basic resin. The products have a molecular weight of between about 300 and about 6000.

Suitable resins for use with the crosslinking component are resins which carry a sufficient number of groups capable of esterification or amidation, in order to guarantee a sufficient crosslinking of the paint film. Suitable resins of such type are disclosed in EP No. -00 12 463 or AT-PS No. 372 099. The preferred resins are the epoxy resins; and for cathodic deposition, the particularly preferred resins are the epoxy resin amine adducts which may optionally be modified to provide internal flexibility.

Processing of the binder systems to provide water-dilutable coating compositions, i.e., neutralization with acids, dilution to the concentration for application or, as in most cases, the co-employment of pigments and extenders, and the possible methods of application are known to those skilled in the art. A preferred method of application of the coating compositions containing the crosslinking components of the present invention is cathodic electrodeposition (CED), whereby the object to be coated is wired as the cathode of the system.

The following examples illustrate the invention without limiting its scope. Parts are by weight and, unless otherwise stated, refer to the resin solids content of the resin components.

EXAMPLE 1

To a blend of 160 g (1 mole) of diethylmalonate, 0.85 g (0.01 moles) of piperidine and 0.54 g (0.01 mole) of formic acid (85%), 33 g (1 mole) of paraformaldehyde (91%) are added at 70° C. in portions in order that through the exothermic reaction the temperature does not rise above 90° C. The reaction blend is stirred at 90° C. until the paraformaldehyde has dissolved completely. The temperature of the reaction blend is raised to 140° C. within 2 hours, while water of the reaction forms. At 140° C., 24 g of water are distilled off with the aid of a hydrocarbon solvent (boiling range 80°–120° C.) as an entraining agent. The entraining agent is vacuum-stripped at 120° C. and held, until the required viscosity and the refractive index is attained.

The obtained product has a solids content of 97±1% (120° C., 30 minutes). The Gardner-Holdt viscosity of a sample of 9 g of resin solution and 1 g of ethylglycol (monoethyleneglycolmonoethylether) is M. The content of free formaldehyde is below 1.5% and the refractive index $n_D^{20} = 1.4560$. The compound has an average molecular weight of about 500. The ester functionality is 6 ester equivalents per mole or 1.17 ester equivalents per 100 grams of the product.

EXAMPLE 2

33 g (1 mole) of paraformaldehyde (91%) are added at 60° C. in 6 portions to a blend of 130 g (1 mole) of acetoacetic acid ethylester, 0.85 g (0.01 moles) of piperidine and 0.54 g (0.01 moles) of formic acid (85%). The preceding portion of paraformaldehyde should be permitted to dissolve before the next increment is added. The reaction temperature should not be allowed to surpass 90° C. Cooling may be necessary. When the whole quantity of paraformaldehyde has been added, the batch is stirred at 90° C., until the paraformaldehyde has dissolved completely. Within 2 hours the temperature is raised to 140° C., while the reaction water starts forming. At 140° C. a total of 24 g of water is distilled off, using a hydrocarbon solvent (boiling range 80°–120° C.) as the entraining agent. The entraining agent is vacuum-stripped at 120° C. and held until the desired viscosity and refractive index are attained.

The obtained compound has a solids content of 94±1% (120° C., 30 minutes). The viscosity of a sample of 9 g resin solution and 1 g of ethylglycol is E (GH). The content of free formaldehyde is below 2% and the refractive index is $N_D^{20} = 1.4750$. The product has an average molecular weight of 500 (gel permeation chromatography). The ester functionality is 3 ester equivalents per mole or 0.70 ester equivalents per 100 g of the product.

EXAMPLE 3

The procedure of Example 1 is repeated, however 5.13 g of di-tertiary butyl peroxide are added prior to vacuum-stripping of the entraining agent. The reaction blend is held at 120° C. after stripping the solvent, until a solids content of at least 98% is attained. A sample of 9 g of resin solution and 1 g of ethylglycol has a viscosity of P (GH). The refractive index $n_D^{20} = 1.4610$ and the molecular weight is about 940 (gel permeation chromatography).

EXAMPLE 4

33 g (1 mole) of paraformaldehyde (91%) are added in portions at 80° C. to a blend of 113 g (1 mole) of cyano acetic acid ethylester, 0.085 g (0.001 moles) of piperidine and 0.054 g (0.001 moles) of formic acid (85%). Prior to adding each portion, the paraformaldehyde of the earlier portion should be dissolved; the reaction temperature should be kept below 100° C. through cooling. When the whole quantity of paraformaldehyde has been added, the batch is stirred at 100° C., until the paraformaldehyde has dissolved completely. The temperature is raised to 120° C. within 1 hour, while reaction water starts forming. At 120° C. 22 g of water are distilled off with the aid of a hydrocarbon solvent (boiling range 80°–120° C.) as an entraining agent. The entraining agent is vacuum-stripped at 120°

C. and held until the desired viscosity and refractive index are attained.

The obtained compound has a solids content of 98±1% (120° C., 30 minutes). The viscosity (Gardner-Holdt) of a sample of 79 g of resin and 61 g of ethylglycol is U. The content of free formaldehyde is below 0.5% and the refractive index $n_D^{20}=1.4615$ (70% in ethylglycol). The product has an average molecular weight of 5000 (gel permeation chromatography). The ester functionality is 40 ester equivalents per mole and 0.80 ester equivalents per 100 g.

EXAMPLE 5

33 g (1 mole) of paraformaldehyde (91%) are added in portions, at 70° C. to a blend of 132 g (1 mole) of dimethylmalonate, 0.17 g (0.002 moles) of piperidine and 0.11 g (0.002 moles) of formic acid (85%). The temperature is controlled so that it does not surpass 90° C. After complete dissolution of the paraformaldehyde, the temperature is raised to 110° C. and 24–25 g of reaction water are distilled off azeotropically, using a hydrocarbon solvent (boiling range 80°–120° C.) as an entraining agent. When the viscosity of an 80% solution in ethylglycol of the product has reached I-J (Gardner-Holdt) the entraining agent is vacuum-stripped. The obtained product has a solids content of 94% (120° C., 30 minutes) and is diluted to 85% with 14.8 g of ethylglycol. The product has the following specification:

Refractive index $n_D^{20}$: 1.4659
Free formaldehyde: below 0.5%
Viscosity (10 g resin solution + 1 g ethylglycol): M (GH)
Average molecular weight: ca. 450
Ester functionality: 1.63 ester equivalents/mole 1 ester equivalent/100 g

EXAMPLE 6

132 g (1 mole) of dimethylmalonate, 0.34 g (0.004 moles) of piperidine, 0.22 g (0.004 moles) of formic acid, 85%, and 16.5 g (0.5 moles) of paraformaldehyde, 91%, are reacted as described in Example 5, until 10–11 g of reaction water have distilled off and a viscosity of B-C (Gardner-Holdt) is attained. The product has the following specification:

Solids content (120° C., 30 minutes): 88%
Refractive index $n_D^{20}$: 1.4473
Intrinsic viscosity (dimethylformamide, 20° C.): 1.87 ml/g
Ester functionality: 7.54 ester equivalents/mole 1.64 ester equivalents/100 g

EXAMPLE 7

As described in Example 5, 328 g (1 mole) of di-2-ethylhexyl malonate, 0.51 g (0.006 moles) of formic acid, 85%, and 33 g of paraformaldehyde, 91%, are reacted until 17 g of water have distilled off. After vacuum-stripping the solvent, the product has the following specification:

Solids content (120° C., 30 minutes): 95%
Free formaldehyde: below 0.4%
Refractive index $n_D^{20}$: 1.4535
Average molecular weight (GPC): 850
Ester functionality: 4.9 ester equivalents/mole 0.58 ester equivalents/100 g

EXAMPLE 8

As described in Example 5, 197 g (1 mole) of cyano acetic acid 2-ethylhexylester, 0.34 g (0.004 moles) of piperidine, 0.22 g (0.004 moles) of formic acid, 85%, and 33 g (1 mole) of paraformaldehyde, 91%, are reacted until 20 g of reaction water have distilled off and a viscosity of H (Gardner-Holdt) of a solution with 83.3% solids in ethylglycol is attained. After vacuum-stripping the entraining agent, the product has the following specification:

Solids content (120° C., 30 minutes): 86%
Nitrogen agent (KJELDAHL): 6.4%
Average molecular weight (GPC): 1080
Ester functionality: 4.5 ester equivalents/mole 0.42 ester equivalents/100 g

EXAMPLE 9

130 g (1 mole) of aceto-acetic acid ethyl-ester, 156 g (1 mole) of isononylaldehyde and 0.002 moles of piperidine and 0.002 moles formic acid are heated to 80° C. within 1 hour. When water formation starts, the temperature is raised to 120° C. within 2 hours, and 20 g of reaction water are distilled off using a hydrocarbon solvent (boiling range 80°–120° C.) as entraining agent. Then, the entraining agent is vacuum-stripped. The product has the following specification:

Free formaldehyde (gaschromatography): below 1%
Viscosity (Gardner-Holdt): A
Refractive index $n_D^{20}$: 1.4615

EXAMPLE 10

According to the method of Example 5, 160 g (1 mole) of diethylmalonate, 92 g (0.5 moles) of methylnonylacetaldehyde and 16.5 g (0.5 moles) of paraformaldehyde, 91%, are reacted in the presence of each 0.004 moles of piperidine and formic acid, until 17 g of reaction water have distilled off. The product has the following specification after vacuum-stripping the entraining agent:

Refractive index $n_D^{20}$: 1.4322
Viscosity (Gardner-Holdt): A
Average molecular weight (GPC): 426
Intrinsic Viscosity (DMF): 2.31 ml/g
Ester functionality: 3.38 ester equivalents/mole 0.79 ester equivalents/100 g

EXAMPLE 11

According to the method of Example 5, 160 g (1 mole) of diethylmalonate, 49 g (0.5 moles) of cyclohexanone, and 165 g (0.5 moles) of paraformaldehyde, 91%, are reacted in the presence of 0.004 moles of each of piperidine and formic acid until 16.5 g of reaction water have distilled. After vacuum-stripping the solvent, the product has the following specification:

Refractive index $n_D^{20}$: 1.4388
Viscosity (Gardner-Holdt): A
Average molecular weight (GPC): 460
Ester functionality: 2.28 ester equivalents/mole 0.495 ester equivalents/100 g To evaluate the crosslinking components of the present invention, the products of the examples are blended in a ratio of 80 parts of basic resin:20 parts of crosslinking component, and tested for phase stability and acetone resistance of a film cured for 30 minutes at 180° C.

The basic resin employed is an epoxy-amine-adduct prepared as follows: 190 g of a bisphenol diglycidyl ether (1 epoxy equivalent) and 1425 g of a bisphenol-glycidylether (3 epoxy equivalents) are dissolved at 100° C. in 597 g of ethylene glycol monoethylether. The solution is cooled to 60° C. and 126 g of diethanolamine are added. The batch is held at 60° C. for 2 hours, and the temperature is slowly raised to 80° C. Then, 169 g of N,N-diethylpropane diamine-1,3 are added, and the temperature is raised to 120° C. within 2 hours. 478 g of the glycidylester of versatic acid are added, and the batch is held at 130° C. while stirring for 5 hours. The reaction product is diluted to 65% resin solids with ethyleneglycol monoethyl ether.

The tests tabulated in Table 1 were carried out as follows:

1. Phase Stability: This means the stability to separation of the components after storage for 10 days at 40° C.

Tests:
(a) On a solution with 70±0.5% solids content in ethyleneglycol monoethyl ether;
(b) On 12% aqueous solution.

Preparation of the Test Solutions:
(a) 123 parts of basic resin (65% resin solids) are combined at 60° C. with 20 parts (solids) of crosslinking component prepared according to the examples and homogenized for 30 minutes.
(b) 123 parts of basic resin (65% resin solids) are mixed at 60° C. with 1.73 parts of formic acid (85% aqueous solution) and stirred for 30 minutes. After addition of 20 parts (solids) of crosslinking component, the blend is homogenized for a further 60 minutes. A 12% test solution is obtained by dilution in increments with 689 parts of deionized water with stirring.

2. Acetone Resistance: Acetone resistance is tested by placing an acetone-soaked cotton pad on a pigmented paint film applied by cathodic electrodeposition and cured for 30 minutes at 180° C. The time is recorded at the point when the film can be destroyed by scratching with a fingernail.

TABLE 1

| Crosslinker Example | Phase Stability, 70% Solution Days | | 40% C 12% Solution Days | | Acetone Resistance Sec. |
|---|---|---|---|---|---|
| 1 | + | >10 | + | >10 | >200 |
| 2 | + | >10 | + | >10 | 150 |
| 3 | + | >10 | + | >10 | >200 |
| 4 | + | >10 | + | 5 | 130 |
| 5 | + | >10 | + | >10 | >200 |
| 6 | + | >10 | + | >10 | >200 |
| 7 | ± | 6 | ± | 10 | 150 |
| 8 | + | >10 | ± | 8 | 160 |
| 9 | + | >10 | ± | 5 | 130 |
| 10 | ± | 5 | ± | 5 | 130 |
| 11 | ± | 8 | — | 5 | 150 |
| Comparison Example 2 of AT-PS 372 900 | — | 6 | — | <1 | 130 |

Evaluation Of Phase Stability:

| | + | − |
|---|---|---|
| 70% Solution | Homogeneous clear blend without phase separation | Turbid solution with growing phase separation |
| 12% Solution | Stable emulsion without sedimentation | Sedimentation |

The coating compositions, optionally after incorporation of pigments and extenders and/or catalysts, optionally co-employing auxiliary solvents, are diluted with water to proper application viscosity. The films cured at 160° to 180° C. show excellent mechanical properties and resistance characteristics to corrosive substances. The performance of primers is particularly good when deposited cathodically.

As will be apparent to one skilled in the art, various modifications can be made within the scope of the aforesaid description. Such modifications being within the ability of one skilled in the art form a part of the present invention and are embraced by the appended claims.

It is claimed:

1. Process for producing hardener components for paint binders which will crosslink through transesterification, characterized in that a compound of the structure X—CH₂—COOR 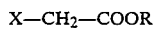

wherein
X is —COOR, —CN or —COCH₃ and
R is an alkyl group with from 1 to 8 C-atoms
is reacted in a KNOEVENAGEL-reaction with a carbonyl compound, water being split off, and the resulting α-disubstituted alkylidene compound thereafter polymerized to a polymeric compound having a molecular weight of from between about 300 and about 6000.

2. Process according to claim 1, wherein compound (I) is a diester of malonic acid with an alkanol having from 1 to 4 C-atoms.

3. Process according to claim 1, wherein the carbonyl compound is formaldehyde.

4. Process according to claim 3, wherein the formaldehyde is in the form of paraformaldehyde.

5. Process according to claim 1, wherein the polymerization reaction is enhanced by peroxide initiators.

6. A crosslinking component for paint binders crosslinkable through esterification comprising the KNOEVENAGEL-reaction product of a compound having the structure X—CH₂—COOR 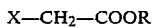

wherein
X is —COOR, —CN or —COCH₃ and
R is an alkyl group with 1 to 8 C-atoms
and a carbonyl compound; said reaction product being polymerized to provide a polymeric compound having a molecular weight of from between about 300 and about 6000.

7. Crosslinking component for paint binders crosslinkable through transesterification, having the general formula

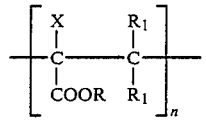

wherein
X is —COOR, —CN or —COCH₃,
R is an alkyl group with 1 to 8 C-atoms,
R₁ is a hydrogen atom or an alkyl radical,
n is a factor multiplying said unit to a molecular weight of from between about 300 and about 6000.

8. Binder systems hardenable through transesterification comprising the crosslinking component of claim 7 and a resin reactive therewith through transesterification.

9. Cathodically depositable paints hardenable through transesterification comprising pigments, extenders, paint additives, and the crosslinking component of claim 7.

* * * * *